2,846,429

ROSIN REFINING

Edwin C. Howard, Hattiesburg, Miss., assignor to Hercules Powder Company, Wilmington, Del., a corporation of Delaware No Drawing. Application November 8, 1954
Serial No. 467,647

3 Claims. (Cl. 260—107)

The present invention relates to a process for separating rosin into a high melting, high acid number fraction by adsorbent refining with a silica gel of special pore structure.

In numerous applications, rosin and rosin derivatives must conform to minimum melting point specifications. Moreover, in certain fields such as protective coatings, printing inks, and synthetic resins, abnormally high melting materials are preferred. Because of this, many processes have been recommended for such an upgrading of gum and wood rosins.

Methods for increasing the melting point which have reached the commercial scale involve polymerization, condensation or resinate formation, or combinations of these processes. All of these procedures, while effective, induce chemical changes on a substantial fraction of the rosin constituents. Further, in only a few processes, such as by condensation with maleic anhydride, is the rosin acid number increased.

In the usual processes of refining rosin by means of adsorbents, relatively small increases in melting point and acid number are often effected. These marginal improvements in rosin properties, however, are considered incidental to the primary objective of color reduction.

Silica gel is one of the common adsorbents used in the color refining of rosin. Heretofore, as far as is known, all of the silica gels that had been used for this purpose are characterized by having average pore diameters of 100 angstroms and above. When these silica gels are contacted with a rosin solution, the primary effect is one of color improvement; changes in acid number and melting point are relatively small.

By this invention it is possible to separate rosin into a high melting, high acid number fraction and a low melting, low acid number fraction without changing the chemical properties of the rosin constituents.

The present invention is based on the discovery that a certain class of silica gels now commercially available which are characterized by having an average pore diameter of less than 60 angstroms can be used advantageously as adsorbents for selectively removing low melting and neutral constituents from rosin without appreciably affecting the color of the rosin. This is a surprising result since it is directly opposed to the results obtained when using silica gels of larger pore diameter.

Accordingly, the invention provides a process for removing low melting and neutral constituents of rosin which comprises contacting a solution of rosin in an inert solvent with a silica gel having an average pore diameter of less than 60 angstroms, preferably less than 40 angstroms. The process may follow any of the manipulative procedures known to the art. As illustrative, a rosin solution may be passed over a bed of the specified silica gel or the rosin solution may be slurried with the silica gel and then recovered by filtration. The process is equally effective on dark rosins and pale rosins of the gum or wood variety.

In order to further illustrate the invention, the following examples are presented. Parts and percentages are by weight unless otherwise specified.

*Example 1*

This example compares the abilities of two different structure silica gels to adsorb low melting constituents from rosin. Silica gel 950–08–08–226 (supplied by Davison Chemical Company) has an average pore diameter of about 20–40 angstroms. Silica gel Grade 70 (also supplied by Davison Chemical Company) has an average pore diameter of about 100 angstroms.

The rosin in this work was obtained by extracting ponderosa pine stumps, at an elevated temperature, with petroleum naphtha. The following ingredients, after being solubilized at an elevated temperature, were placed in each of three vessels: 100 parts of rosin and 300 parts petroleum naphtha. Upon cooling to room temperature, the soluble rosin solutions were decanted and treated as follows:

(a) One solution was evaporated using a sparge of carbon dioxide.

(b) The second petroleum naphtha solution was mixed intimately with 100 parts of silica gel Grade 70 for one hour at 60° C. After the adsorbent (and adsorbate) was removed by filtration, the petroleum naphtha was evaporated as in (a).

(c) The third petroleum naphtha solution was treated in exactly the same manner as in (b) except that a different silica gel was used: 100 parts of silica gel 950–08–08–226.

Analyses of the soluble rosin fractions, obtained as above, before and after refining, follow:

| Product Rosin | Experiment Number | | |
|---|---|---|---|
| | (a) | (b) | (c) |
| Yields, Percent | 100.0 | 71.2 | 74.2 |
| Melting Point, °C | 73.0 | 74.0 | 84.5 |
| Acid Number | 141.2 | 150.8 | 154.9 |
| Color (U. S. D. A.) | $D_7$ | $K_4$ | $E_5$ |

*Example 2*

The purpose of this example is to illustrate the broad range of rosin concentrations that can be employed in the refining operation. The feed rosin and solubilizing procedure were the same as that used in Example 1; the solutions were prepared using:

| Ingredient | Experiment Number | | | |
|---|---|---|---|---|
| | 1 | 2 | 3 | 4 |
| Feed Rosin (parts) | 100 | 100 | 100 | 100 |
| Petroleum Naphtha (parts) | 400 | 233 | 150 | 100 |

The supernatant solutions were decanted and intimately mixed with 100 parts of silica gel 950–08–05–215 (supplied by Davison Chemical Company) (average pore diameter of 20–40 angstroms). Refined rosin recovered by evaporation analyzed as follows:

| Product Rosin | Experiment Number | | | |
|---|---|---|---|---|
| | 1 | 2 | 3 | 4 |
| Yield, percent | 70.0 | 74.5 | 76.5 | 77.5 |
| Melting Point, °C | 84.0 | 83.5 | 82.0 | 82.0 |
| Acid Number | 157.9 | 155.8 | 154.9 | 152.0 |
| Color | $E_7$ | $E_0$ | $D_3$ | $D_2$ |

The above improvements in melting point and acid number were obtained on a soluble rosin fraction having the characteristics shown in Example 1(a).

Example 3

Many commercial adsorbent refining processes employ systems of multiple columns involving repeated use of the adsorbent. In this example, the practicability of such an operation is demonstrated using, as the revivification solvent, acetonitrile (84%) and water (16%). The silica gel was the same as that used in Example 2.

Three different experiments are included in which either the rosin or method of preparing the crude solution has been varied:

(a) In this experiment, crude rosin extracted from ponderosa pine stump wood with petroleum naphtha was used. The feed solution for the refining operation was prepared by solubilizing the rosin in petroleum naphtha at an elevated temperature, then cooling to about 20–25° C. and allowing the insoluble fraction to separate.

(b) Rosin obtained as in (a) was used in this experiment. The feed solution was prepared by solubilizing the following ingredients at an elevated temperature, then cooling to room temperature: 30 parts rosin, 70 parts petroleum naphtha and 2.6 parts acetonitrile azeotrope (84% acetonitrile–16% water). The petroleum naphtha phase (1.4% acetonitrile) was separated and contacted with the adsorbent.

(c) Crude rosin extracted from ponderosa pine stump wood with toluene was used in this experiment. As in (b), the petroleum naphtha insoluble fraction was separated as a fluid phase using the following formula: 40 parts rosin, 70 parts petroleum naphtha, 3 parts acetonitrile, and 1.3 parts water. The feed (petroleum naphtha) solution for the refining step contained 1.0% acetonitrile.

Summary data on the above refining operations follow:

|  | Experiment Number | | |
|---|---|---|---|
|  | (a) | (b) | (c) |
| Petroleum Naphtha Soluble Rosin (Feed): | | | |
|   Melting Point, °C | 73.0 | 73.0 | 69.5 |
|   Acid Number | 138 | 139 | 136 |
|   Specific Rotation (°) | +13 | +10 | +22 |
|   Color | $D_4$ | $D_4$ | $F_2$ |
| Refined Rosin Fraction percent | 80.0 | 85.2 | 85.2 |
|   Melting Point, °C | 83.2 | 79.8 | 79.0 |
|   Acid Number | 152 | 151 | 148 |
|   Specific Rotation (°) | +11 | +11 | +22 |
|   Color | $D_3$ | $D_4$ | $E_6$ |
| Adsorbed Rosin Fraction percent | 20.0 | 14.8 | 14.8 |
|   Melting Point, °C | 41.5 | 53.0 | 47.0 |
|   Acid Number | 78 | 76 | 78 |

The adsorbent refining operation in each case was carried out at 20–25° C. using nine adsorbent columns in progressive series. When the adsorbent became spent, it was revivified by passage of acetonitrile through a column and continued operation of each experiment yielded rosins of similar quality.

Example 4

The purpose of this example is to demonstrate that the process developed can be used to upgrade "color refined" rosins. In this example, an adsorbent earth color refined rosin of ponderosa pine origin was treated with the same silica gel as used in Example 3.

In a series of side-by-side experiments, four solutions were prepared using the following formulation: 100 parts rosin and 300 parts of petroleum naphtha. After contacting each solution with various amounts of silica gel at room temperature, the unadsorbed fractions were isolated and analyzed:

|  | (a) | (b) | (c) | (d) |
|---|---|---|---|---|
| Silica gel, parts | none | 25 | 50 | 100 |
| Refined rosin: | | | | |
|   Yield, Percent | 100.0 | 93.5 | 88.0 | 79.0 |
|   Melting Point, °C | 76.5 | 78.0 | 80.0 | 88.0 |
|   Acid Number | 147.9 | 151.5 | 154.1 | 162.3 |
|   Color | $M_1$ | $M_3$ | $M_3$ | $M_1$ |

The benefits of the silica gel refining are apparent.

Example 5

In this example, furfural-refined rosin derived from southern pine is upgraded in acid number and melting point as in the preceding example.

Four solutions (composed of 100 parts rosin and 300 parts petroleum naphtha) were contacted with various amounts of silica gel at 20–25° C. and a refined rosin recovered by evaporation. Results are as follows:

|  | Experiment Number | | | |
|---|---|---|---|---|
|  | (a) | (b) | (c) | (d) |
| Silica gel, parts | None | 25 | 50 | 100 |
| Refined rosin: | | | | |
|   Yield, Percent | 100.0 | 95.0 | 88.5 | 81.5 |
|   Melting point, °C | 82.5 | 85.0 | 88.5 | 90.5 |
|   Acid number | 167.4 | 169.3 | 171.3 | 173.7 |
|   Color | $K_2$ | $K_5$ | $K_5$ | $K_5$ |

Example 6

Examples 4 and 5 showed the feasibility of raising the acid number and melting point of color-refined rosins. This example shows the reverse procedure is also operable.

A solution of ponderosa pine-derived rosin, which had been refined only with fine pore silica gel according to the invention was dissolved in petroleum naphtha to a concentration of 30.8%. This "refined" rosin analyzed: melting point 78.5° C., color $D_5$, and acid number 148.9. Aliquots of this solution (484 parts) were contacted with either 150 parts Florex (fuller's earth) or 70.5 parts freshly distilled water-saturated furfural, at 20–25° C. The further refined rosin analyzed as follows:

|  | Experiment | |
|---|---|---|
|  | (a) | (b) |
| Color Refining Agent | Florex | Furfural |
| Product Rosin: | | |
|   Yield, Percent | 83.5 | 86.0 |
|   Melting point, °C | 82.0 | 76.0 |
|   Acid number | 153.8 | 151.2 |
|   Color | $H_2$ | $G_1$ |

The inert solvent is preferably a normally liquid paraffinic hydrocarbon such as petroleum naphtha, pentanes, hexanes and heptanes. This solvent is simply an inert carrier for the rosin and serves in the same capacity as in prior art adsorption processes. The weight ratio of solvent to rosin should be at least 1:1 and preferably in a proportion which provides a rosin concentration of 10–35% by weight.

The ratio of rosin to the silica gel adsorbent can be widely varied and, in all instances, greater increases in melting point and acid number will be obtained than when using an equivalent amount of conventional silica gel. A practical ratio is from 0.1 to 5 parts of silica gel to each part of rosin. The adsorbent will eventually become spent, the time depending on the quantity of low melting and neutral constituents in the rosin and on the amount of adsorbent relative to the amount of rosin. The spent adsorbent can then be revivified, if desired, using a suitable revivification solvent such as acetone, methanol or acetonitrile by procedures known to the art. This removes the low melting and neutral constituents from the surfaces of the silica gel and enables it to be used again for contacting fresh rosin solutions.

The invention is susceptible to many additional modifications within the skill of the art. For example, it is possible to use a mixture of the specified silica gel with a conventional color refining adsorbent so that both color improvements and the removal of low melting and neutral constituents can be effected in one operation.

The rosins obtained in the practice of the invention have been found to be of improved quality. They are more efficient in paper sizing applications and yield synthetic resins of superior properties compared to conventionally refined rosins of the same origin. The rosins may be subjected to known processes for producing modified rosins such as polymerization, esterification or hydrogenation and, when so used, yield products having higher melting points than usual.

What I claim and desire to protect by Letters Patent is:

1. A process for removing low melting and neutral constituents from rosin which comprises contacting a solution of rosin in an inert solvent with a silica gel having an average pore diameter of less than 60 angstroms.

2. The process of claim 1 in which the solvent comprises a normally liquid paraffinic hydrocarbon.

3. The process of claim 1 in which the silica gel has an average pore diameter of less than 40 angstroms.

References Cited in the file of this patent

UNITED STATES PATENTS

| | | |
|---|---|---|
| 1,537,260 | Patrick | May 12, 1925 |
| 2,181,791 | Price | Nov. 28, 1939 |
| 2,306,610 | Barrer | Dec. 29, 1942 |
| 2,322,316 | Rummelsburg | June 12, 1943 |
| 2,413,134 | Barrer | Dec. 24, 1946 |
| 2,487,805 | Hermanson | Nov. 15, 1949 |
| 2,493,866 | Gayer | Jan. 10, 1950 |
| 2,495,852 | Lien et al. | Jan. 31, 1950 |